United States Patent [19]
Korver et al.

[11] Patent Number: 5,928,309
[45] Date of Patent: Jul. 27, 1999

[54] NAVIGATION/GUIDANCE SYSTEM FOR A LAND-BASED VEHICLE

[76] Inventors: Kelvin Korver, R.R. 1, P.O. Box 93A, Adams, Nebr. 68301; Wesley Hawkinson, 94 Shasta Cir. E., Chanhassen, Minn. 55317; Donovan Boedigheimer, 1967 113th Ave., NW., Coon Rapids, Minn. 55433

[21] Appl. No.: 08/596,957

[22] Filed: Feb. 5, 1996

[51] Int. Cl.$^6$ .................................................. G01C 21/00
[52] U.S. Cl. ................... 701/214; 56/10.2 R; 56/10.2 F; 342/359; 342/457; 343/713; 701/41; 701/50; 701/205; 701/220
[58] Field of Search ..................................... 701/1, 41, 50, 701/116, 200, 205, 207, 213, 214, 216, 220, 221, 224, 300; 342/41, 74, 75, 77, 107, 108, 125, 420, 463, 356, 357, 358, 359, 457; 343/711, 713, 718; 56/10.2 R, 10.2 A, 10.2 D, 10.2 F

[56] References Cited

U.S. PATENT DOCUMENTS

| | | | |
|---|---|---|---|
| 4,599,620 | 7/1986 | Evans | 343/357 |
| 4,667,203 | 5/1987 | Counselman, III | 342/357 |
| 4,796,191 | 1/1989 | Honey et al. | 364/450 |

(List continued on next page.)

FOREIGN PATENT DOCUMENTS

| | | |
|---|---|---|
| 0 406 877 A2 | 7/1990 | European Pat. Off. . |
| 0 595 685 A1 | 10/1993 | European Pat. Off. . |
| 0 716 315 A1 | 6/1996 | European Pat. Off. . |
| 0 736 441 A1 | 10/1996 | European Pat. Off. . |
| 2 669 118 A1 | 11/1990 | France . |
| 2 703 200 A1 | 3/1993 | France . |
| 2 708 117 A1 | 6/1993 | France . |
| 43 42 171 A1 | 5/1994 | Germany . |
| 43 04 561 A1 | 8/1994 | Germany . |
| 195 04 475 A1 | 8/1995 | Germany . |
| 196 04 812 C1 | 12/1996 | Germany . |
| 3-4704 | 10/1991 | Japan . |
| 6-225231 | 12/1994 | Japan . |
| PCT/JP94/ 020886 | 6/1995 | Japan . |
| 1624449 A1 | 1/1991 | U.S.S.R. . |
| 1661826 A1 | 7/1991 | U.S.S.R. . |
| 1693602 A1 | 11/1991 | U.S.S.R. . |
| 2 274 170 | 7/1994 | United Kingdom . |
| WO 91/09375 | 6/1991 | WIPO . |
| WO 95/08778 | 3/1995 | WIPO . |
| WO 95/18432 | 7/1995 | WIPO . |

OTHER PUBLICATIONS

Patents Abstracts of Japan,; EPO Patent Office; Pub. No. 04164277; Dated Sep. 6, 1990; Appl. Honda Motor Co. Ltd; Inventor—IIboshi Akira; Int.

P. Daum et al., Aided Intertial Land Navigation System (ILANA) with a Minimum Set of Inertial Sennsors, Position Location and Navigation Symposium (PLANS), Las Vegas, Apr. 11–15, 1994, 11 Apr. 1994, Institute of Electrical and Electronics Engineers, pp. 284–291, XP000489353 (see p. 284, right hand column).

Ash et al., "GPS/Inertial Mapping (GIM) System for Real Time Mapping of Roadways Using WADGPS", 1995, pp. 1825–1828, ION Fall Meeting, Palm Springs, CA.

*Primary Examiner*—William A. Cuchlinski, Jr.
*Assistant Examiner*—Ed Pipala
*Attorney, Agent, or Firm*—Zarley, McKee, Thomte, Voorhees & Sease

[57] ABSTRACT

A navigation/guidance system uses a dead reckoning navigator with periodic GPS fixes to correct the drift of the inertial system. The navigation system primarily uses speed sensed by Doppler radar and attitude and heading sensed by a set of gyros. The navigation system uses various processes to compensate for any sensor errors. The system uses attitude data to compensate for GPS leverarm errors. The system can be used on a land-based vehicle to economically and accurately provide navigation data.

51 Claims, 6 Drawing Sheets

U.S. PATENT DOCUMENTS

| | | | |
|---|---|---|---|
| 4,860,018 | 8/1989 | Counselman, III | 342/357 |
| 4,878,170 | 10/1989 | Zeevi | 364/449 |
| 4,949,268 | 8/1990 | Nishikawa et al. | 364/449 |
| 5,014,066 | 5/1991 | Counselman, III | 342/352 |
| 5,030,957 | 7/1991 | Evans | 342/357 |
| 5,043,902 | 8/1991 | Yokoyama et al. | 364/449 |
| 5,075,693 | 12/1991 | McMillan et al. | 701/207 X |
| 5,093,839 | 3/1992 | Kohno et al. | 375/1 |
| 5,132,695 | 7/1992 | Dumas et al. | 342/461 |
| 5,143,073 | 9/1992 | Dory | 128/660 |
| 5,150,712 | 9/1992 | Dory | 128/660 |
| 5,155,490 | 10/1992 | Spradley, Jr. et al. | 342/357 |
| 5,166,688 | 11/1992 | Moreira | 342/25 |
| 5,177,489 | 1/1993 | Hatch | 342/357 |
| 5,194,871 | 3/1993 | Counselman, III | 342/357 |
| 5,202,829 | 4/1993 | Geier | 364/449 |
| 5,214,757 | 5/1993 | Mauney et al. | 395/161 |
| 5,220,876 | 6/1993 | Monson et al. | 111/130 |
| 5,274,329 | 12/1993 | Knuttel et al. | 324/307 |
| 5,291,412 | 3/1994 | Tamai et al. | 364/449 |
| 5,299,130 | 3/1994 | Ono | 701/25 |
| 5,323,322 | 6/1994 | Mueller et al. | 364/449 |
| 5,325,302 | 6/1994 | Izidon et al. | 364/461 |
| 5,344,144 | 9/1994 | Canon | 273/138 |
| 5,347,286 | 9/1994 | Babitch | 342/359 |
| 5,375,059 | 12/1994 | Kyrtsos et al. | 364/449 |
| 5,379,320 | 1/1995 | Fernandes et al. | 375/1 |
| 5,382,957 | 1/1995 | Blume | 342/43 |
| 5,384,574 | 1/1995 | Counselman, III | 342/357 |
| 5,390,124 | 2/1995 | Kyrtsos | 364/449 |
| 5,390,125 | 2/1995 | Sennott et al. | 364/449 |
| 5,392,052 | 2/1995 | Eberwine | 342/357 |
| 5,420,593 | 5/1995 | Niles | 342/357 |
| 5,422,814 | 6/1995 | Sprague et al. | 364/449 |
| 5,430,654 | 7/1995 | Kyrtsos et al. | 364/449 |
| 5,438,337 | 8/1995 | Aguado | 342/357 |
| 5,438,517 | 8/1995 | Sennott et al. | 364/449 |
| 5,442,558 | 8/1995 | Kyrtsos et al. | 364/449 |
| 5,517,419 | 5/1996 | Lanckton et al. | 701/216 |
| 5,523,951 | 6/1996 | Kriesgman et al. | 701/21 |
| 5,534,875 | 7/1996 | Diefes et al. | 342/357 |
| 5,592,382 | 1/1997 | Colley | 701/207 |
| 5,606,506 | 2/1997 | Kyrtsos | 701/207 |
| 5,617,317 | 4/1997 | Ignagni | 701/215 |
| 5,657,025 | 8/1997 | Ebner et al. | 342/357 |

NAVIGATION/GUIDANCE SYSTEM FOR A LAND-BASED VEHICLE

BACKGROUND OF THE INVENTION

1. Field of the Invention

The present invention relates to inertial navigation systems. More particularly, though not exclusively, the present invention relates to an inertial navigation/guidance system using a radio navigation receiver to correct the navigation errors.

2. Problems in the Art

Differential global positioning system (DGPS) based guidance systems for airborne application of agrochemicals has met with huge success and it follows that this technology could be used with ground rig applicators if certain technical problems can be overcome. The primary differences between air and ground application processes are associated with the operators view of the land and the operational dynamic environment.

During airborne applications, the pilot generally has a large part of the area involved to be sprayed in view and the GPS antenna (mounted on top of the canopy) follows a relatively straight line when in an application swath. This provides for the required cross track position stability to obtain a well controlled application process.

With ground rig applicators, such as tractors or floaters, the operator may have a limited view of the involved spray area and depending on the size/shape of the field and of the local ground cover it can be very difficult to determine where the previous swath coverage ends in order to proceed with the ensuing swath. A GPS antenna mounted on top of the ground vehicle (where it would be exposed to the GPS satellites) will experience large attitude excursions as the rig swaths the field. This results in GPS derived cross track position excursions relative to the vehicle ground track which would contaminate any attempt to parallel a defined field line. It can therefore be seen that there is a need for a better navigation/guidance system for use with a ground-based vehicle.

There is a need for a solution to various problems relating to ground rig applicators such as tractors and floaters. These ground rig applicators have several disadvantages. Since the application of agrochemicals is a seasonal process (3–4 months per year), the workers hired to operate the floaters are seasonal workers. As a result, the seasonal workers are often inexperienced or unreliable in the operation of the floaters. This increases the probability that the operator will skip areas of the field or apply double coverage to overlapping areas. These problems cost the seller of the chemicals and the farmer thousands of dollars. A typical floater will cost $100,000 and will apply $500,000–$1 million dollars worth of chemicals per year. It can therefore be seen that efficient operating of a floater is very important. Typical prior art floaters are guided through a field by following a trail of foam markers which are marked on the field on the previous swath. As a result, there is a lot of room for human error and the floaters cannot be operated at night. A need can therefore be seen which would allow the floaters to operate accurately day or night throughout the season. Such a solution would allow a chemical applier to operate half as many machines. An accurate, real-time inexpensive navigation/guidance system would remedy these problems.

Various prior art navigation systems for ground-based vehicles have several disadvantages. Systems using Doppler radar will encounter errors with the radar. Similarly, gyros will encounter drift errors which will continue to increase unless the drift error is corrected. Gyros that are inexpensive enough to be feasible to use may have drift rates high enough to make them unusable. For example, a typical inexpensive gyro sensor may have a drift rate uncertainty as high as 3600° per hour which makes the gyro unusable for most applications. As a result, gyros have good short term characteristics but bad long term characteristics as the drift error becomes larger as time goes on.

When navigating using dead reckoning you need a very high fidelity heading measurement which has not been achieved adequately using low costs sensors.

Various prior art systems navigating by GPS also have disadvantages. Prior art systems using GPS use GPS as the primary navigator. This intensifies the problems found with GPS. A GPS position calculation has a lag time. As a result, the position solution provided by a GPS receiver tells a user where the vehicle was a moment ago not in real time. Another problem with GPS systems are the errors resulting from the antenna lever arm problem. A GPS antenna typically is a certain distance away from the GPS receiver. Since the GPS antenna is the collection point of the GPS signals received, the position solution will not accurately describe the position of the GPS receiver or some other reference point. If the geometrical distance between the GPS receiver or reference point and the GPS antenna is known, the position of the reference point may be calculated. However, as a ground based vehicle travels over uneven terrain such as terraces, slopes, ruts, bumps, etc., the actual position of the GPS antenna cannot be determined resulting in erratic GPS position solutions.

Most prior art attempts to use a GPS navigation system attempted to deal with problems by correcting GPS drift and lag time. However no prior art system navigating by GPS has achieved the high accuracy and real time solutions required for applications requiring a high level of accuracy. The prior art attempts have not provided an adequate solution because GPS does not provide a continuous navigation solution. A GPS system will update its position periodically, not in real time, and a lag time is still involved. Another problem with a GPS system is the possibility of a signal dropout of the satellite signals. The accuracy of a GPS system is also limited due to the errors caused by the ionosphere. Another problem with GPS systems is that altitude data provided by a GPS receiver is not precise.

Another problem with GPS systems is that a GPS system cannot accurately supply guidance data for a curved path. This problem relates to the lag time involved with GPS. A GPS system can only do linear interpolation of GPS position solutions which is inadequate for navigating a curved path. A GPS system also will not provide high quality heading information. Finally, the altitude calculated by a GPS receiver is inaccurate and unusable for certain applications.

FEATURES OF THE INVENTION

A general feature of the present invention is the provision of an inertial navigation/guidance system.

A further feature of the present invention is the provision of an inertial navigation/guidance system for use on a land-based vehicle.

A further feature of the present invention is the provision of an inertial navigation/guidance system that senses the attitude of the vehicle.

A further feature of the present invention is the provision of an inertial navigation/guidance system which uses a radio navigation receiver to correct the drift errors of the inertial system.

A further feature of the present invention is the provision of an inertial navigation/guidance system which uses inexpensive sensors to achieve a highly accurate result.

A further feature of the present invention is the provision of an inertial attitude determination system which is stand alone.

A further feature of the present invention is the provision of an inertial navigation/guidance system which uses gyro information to compute the attitude and heading of the vehicle and a position change sensor to sense the speed of the vehicle.

A further feature of the present invention is the provision of an inertial navigation/guidance system which uses accelerometers to measure the pitch and roll of the vehicle to refine the sensed attitude of the vehicle.

A further feature of the present invention is the provision of an inertial navigation/guidance system which includes software to control the functions of the system.

A further feature of the present invention is the provision of an inertial navigation/guidance system which uses the sensed attitude of the vehicle to determine the position of the radio navigation antenna in order to correct the lever-arm error.

A further feature of the present invention is the provision of a system for use on a boat or ship.

A further feature of the present invention is the provision of a system which is part of a surveying system.

These as well as other features of the present invention will become apparent from the following specification and claims.

SUMMARY OF THE INVENTION

The navigation and guidance system of the present invention provides accurate navigation data in real time using a dead reckoning navigator with periodic radio navigation fixes to correct for the drift of the inertial system. The system senses the speed, heading and attitude of the vehicle to determine a position of the vehicle. An external position reference provided by the radio navigation system is used to correct any error in the determined position.

The system is capable of correcting for the radio navigation antenna lever arm errors by using the attitude of the vehicle. The system may optionally be used on a ground or water based vehicle to provide navigation data and guidance commands to an automatic steering system. The system of the present invention may also be used on a agricultural vehicle to guide the vehicle through a field in a number of ways.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention. While the present invention is described as being used on a land based vehicle, it is intended that the invention cover other applications. Also, the term land-based vehicle is meant to include vehicles on the ground or in the water, "land-based" is meant only to distinguish from airborne applications.

The navigation/guidance system of the present invention is a dead reckoning navigator which uses periodic GPS fixes to correct the drift of the inertial system. The system uses GPS antenna attitude compensation to improve the accuracy of the GPS fixes. The system primarily uses speed sensed by Doppler radar and attitude and heading sensed by a set of gyros. As discussed above, systems using a Doppler sensor and gyros have the problem of errors in the sensors. In addition, in order to use inexpensive sensors, very large errors are encountered. The system uses various processes to compensate for the errors. The heading sensed by the gyros is aided by a magnetic heading compass and a GPS receiver. The speed sensed by the Doppler radar is also aided by the GPS receiver. The system also uses accelerometers to improve the accuracy of the system. A set of horizontal accelerometers measure the roll and pitch of the vehicle. This is used to provide the attitude integration algorithm (discussed below) with the vehicle horizontal rotations to more accurately calculate the attitude and heading.

Figure 1:
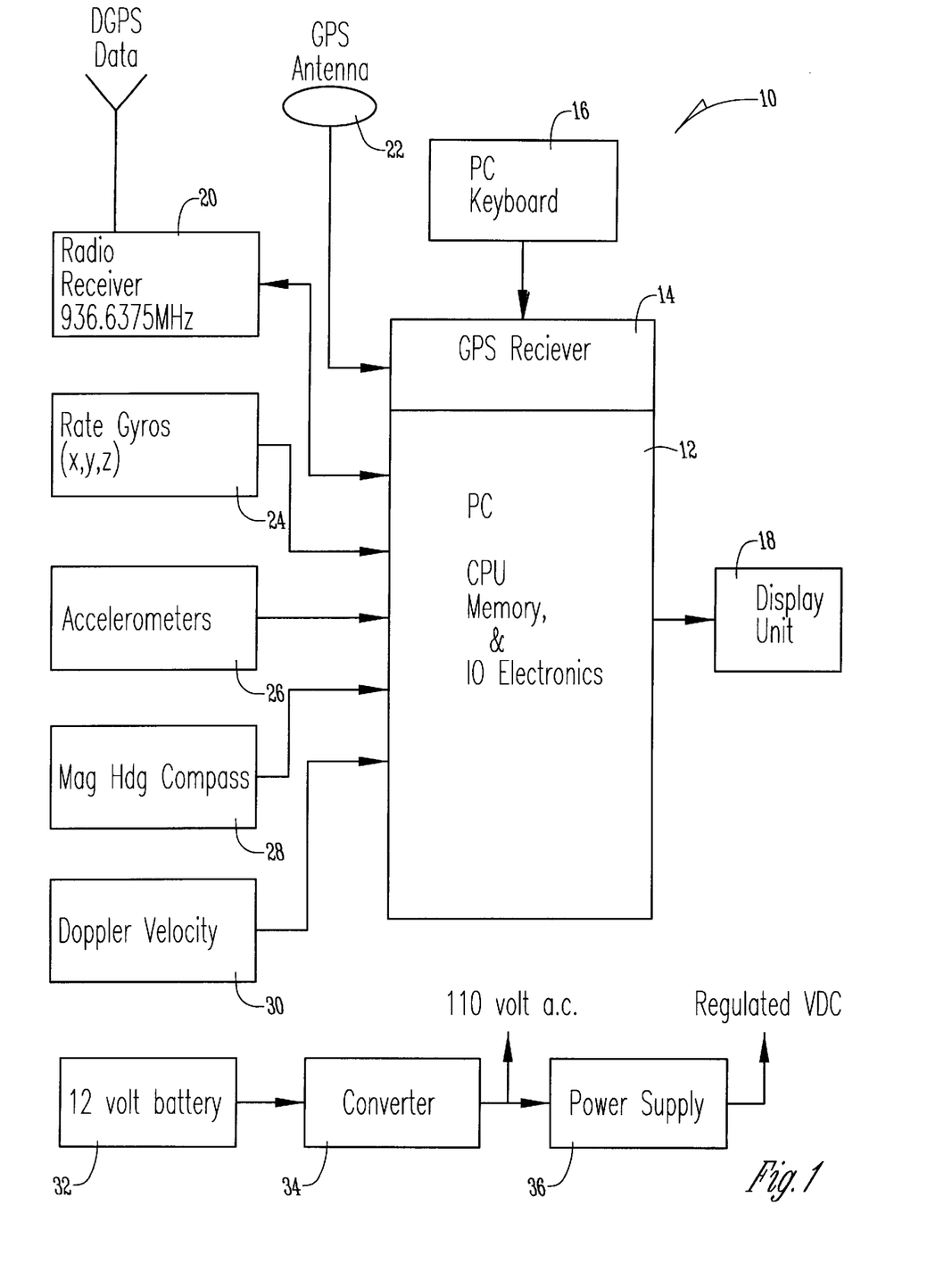
FIG. 1 shows a block diagram of the primary hardware elements of the navigation/guidance system of the present invention.

FIG. 1 shows the primary hardware elements of the inertial navigation/guidance system 10 of the present invention. The system 10 is comprised of a personal computer (PC) 12 which includes a CPU, memory and input/output electronics. Although the embodiment shown in the drawings shows a personal computer, the invention could use a processor circuit that includes a CPU, memory, and input/output electronics on a single processor card. A GPS receiver 14 plugs directly into an open PC expansion slot. Any GPS receiver suitable for use with the present invention may be used, however the preferred GPS receiver is the NovAtel GPS receiver card #951R. Alternatively, the system 10 could simply have a connector that would receive GPS data from any existing GPS receiver. Any other type of radio navigation system or combination of systems could be substituted for the GPS system such as LORAN, GLONASS, etc. A keyboard or keypad 16 is connected to the PC 12 and is used as a user interface to input data or control the system 10. A display unit 18 is also connected to the PC 12. The display unit 18 is used to display various information to a user. The display unit 18 could take on many forms, but is preferably comprised of a CRT display. The display unit could even be comprised of a display screen that shows the operator a graphic of a field or portion of the field and could indicate where the vehicle has been and where it is going. All sensor input data to the PC 12 will be digital serial. If any of the selected sensors provide only analog outputs, A/D converters will be used where required to obtain the appropriate input data formats. Also shown in FIG. 1 is a block diagram of the power supply circuit used by the present invention. The power supply circuit includes a 12 volt battery 32, a voltage converter 34 and a power supply 36. The power supply circuit provides the system 10 with 110 volts AC and a regulated DC voltage.

A portable DGPS receiver 20 is also connected to the PC 12. The DGPS radio receiver 20 receives DGPS data for use by the PC to overcome the effects of Selective Availability (SA) as well as other imperfections in the time-coded signals broadcast by the NAVSTAR satellites. The use of DGPS provides a more accurate location solution than GPS alone. The DGPS radio receiver 20 may be any type of DGPS receiver suitable for use with the present invention but is preferably the Smartbase model number 10, manufactured by Premier GPS Inc. Also note that the present invention would work without using DGPS, although the accuracy may be less. One alternative to the preferred embodiment is to use a receiver that uses a combination of GPS and GLONASS signals to produce a more accurate radio navigation system.

A GPS antenna 22 is connected to the GPS receiver 14 to provide the GPS receiver 14 with GPS signals from the NAVSTAR satellites. The GPS antenna 22 acts as the collection point for GPS signals received by the GPS receiver 14. The GPS antenna 22 is mounted to the host vehicle at a known location such that the location of the antenna 22 is always known relative to the GPS receiver 14 or some other reference point.

As shown in FIG. 1, a number of sensors are also connected to the PC 12. Three rate gyros 24, three accelerometers 26, and a magnetic heading compass 28 are connected to the PC 12 to provide the system with various data. Preferably, the gyros 24, accelerometers 26 and the magnetic heading compass 28 are assembled together in a single unit. A position change sensor 30, preferably comprised of a Doppler radar is also connected to the PC 12 to provide the system with speed data. Although the preferred embodiment uses three each of the gyros 24 and accelerometers 26, more or less could be used. The choice of using two or three accelerometers depends on such factors as the level of accuracy desired, the application of the system, and the sophistication of the Kalman filter, etc. The gyros 24 act as angular change sensors, so therefore, any device with the same function could be substituted for the gyros 24. The preferred gyros are the model ENV-05H-02 manufactured by Murata Erie Co., Ltd. Similarly, the accelerometers 26 could be substituted by an equivalent device such an inclinometer, tilt sensors, etc. The preferred accelerometer is the model 02753-01 manufactured by Lucas Control System Products. The magnetic heading compass could also be substituted by any other heading sensor, for example, a fluxgate compass. The preferred magnetic heading compass is the model C100 manufactured by KVH Industries, Inc. Also note that the magnetic heading compass 28 is optional. Depending on the sophistication of the Kalman filter and other factors, the magnetic heading compass 28 may not be needed by the system. The Doppler radar 30 functions as a position change sensor, so therefore any equivalent device could be substituted for the Doppler radar such as an odometer or any other device used to derive the vehicle speed. The preferred Doppler radar is the model Radar II manufactured by Dickey-John.

Figure 2:
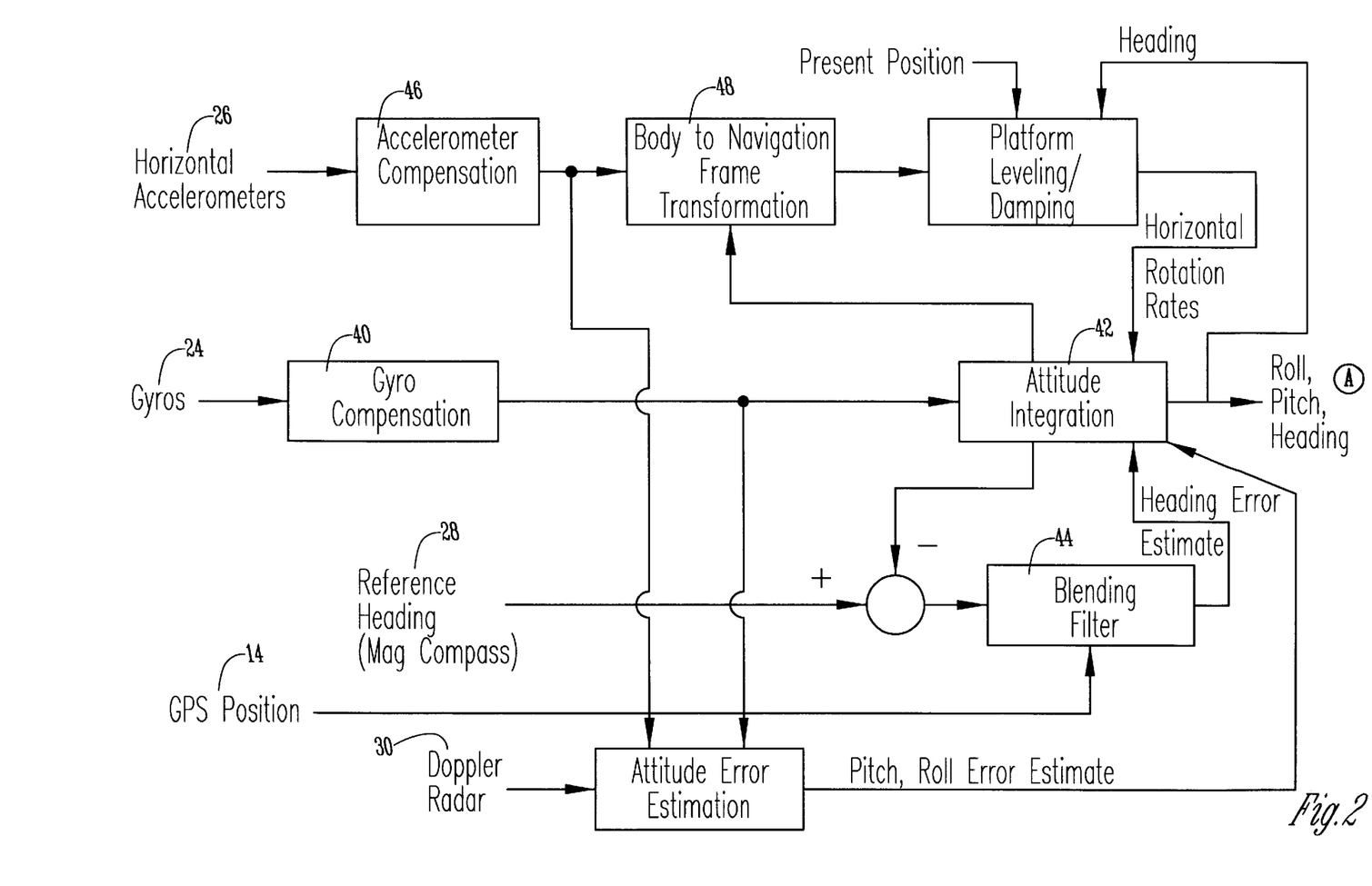
FIG. 2 shows a functional block diagram of the attitude/heading portion of the present invention.

FIG. 2 shows a functional block diagram of the attitude/heading portion of the invention. The navigation/guidance system 10 uses software which performs the functions described and outlined in the figures. As described below, the attitude integration algorithm 42 uses the angular rates from the gyros 24, horizontal accelerations from the horizontal accelerometers 26, and heading and attitude error estimates from the other sensors to calculate a value for the vehicle's attitude (pitch and roll) and heading. The attitude and heading are primarily sensed by the gyros 24. The various sensors are used together as shown in the figures to obtain a more accurate value for attitude (pitch and roll) and heading. The data from the gyros 24 is applied the gyro compensator function 40 which applies constant values such as a scale factor, misalignment and fixed bias to the data and also applies changing values such as an estimated dynamic bias to the data. The data is then provided to the attitude integration algorithm 42 to calculate the attitude and heading. The horizontal accelerometers 26 provide data to the accelerometer compensation function 46 which applies constant values such as scale factor, bias, and misalignments to the data. The compensated data from the accelerometers 26 is then provided to a direction cosine matrix (shown in FIG. 2 as the body to navigation frame transformation function 48) and a platform leveling/damping function 50. The yaw attitude is slaved to the magnetic heading reference supplied by the magnetic heading compass 28. This, along with data from the GPS position are used by a blending filter 44 to provide a heading error estimate to the attitude integration algorithm 42. A pitch and roll error estimate is also provided to the attitude integration algorithm 42. The pitch and roll error estimate is derived from data from the Doppler radar 30, the horizontal accelerometers 26, and the gyros 24.

The attitude, heading and corresponding time are saved in a data table for interpolation to the GPS data time. This interpolated data is required to provide position corrections to the GPS position fix (see discussion of FIG. 3 below) for use in the dead reckoning navigation function shown in FIG. 4 (discussed below).

Figure 3:
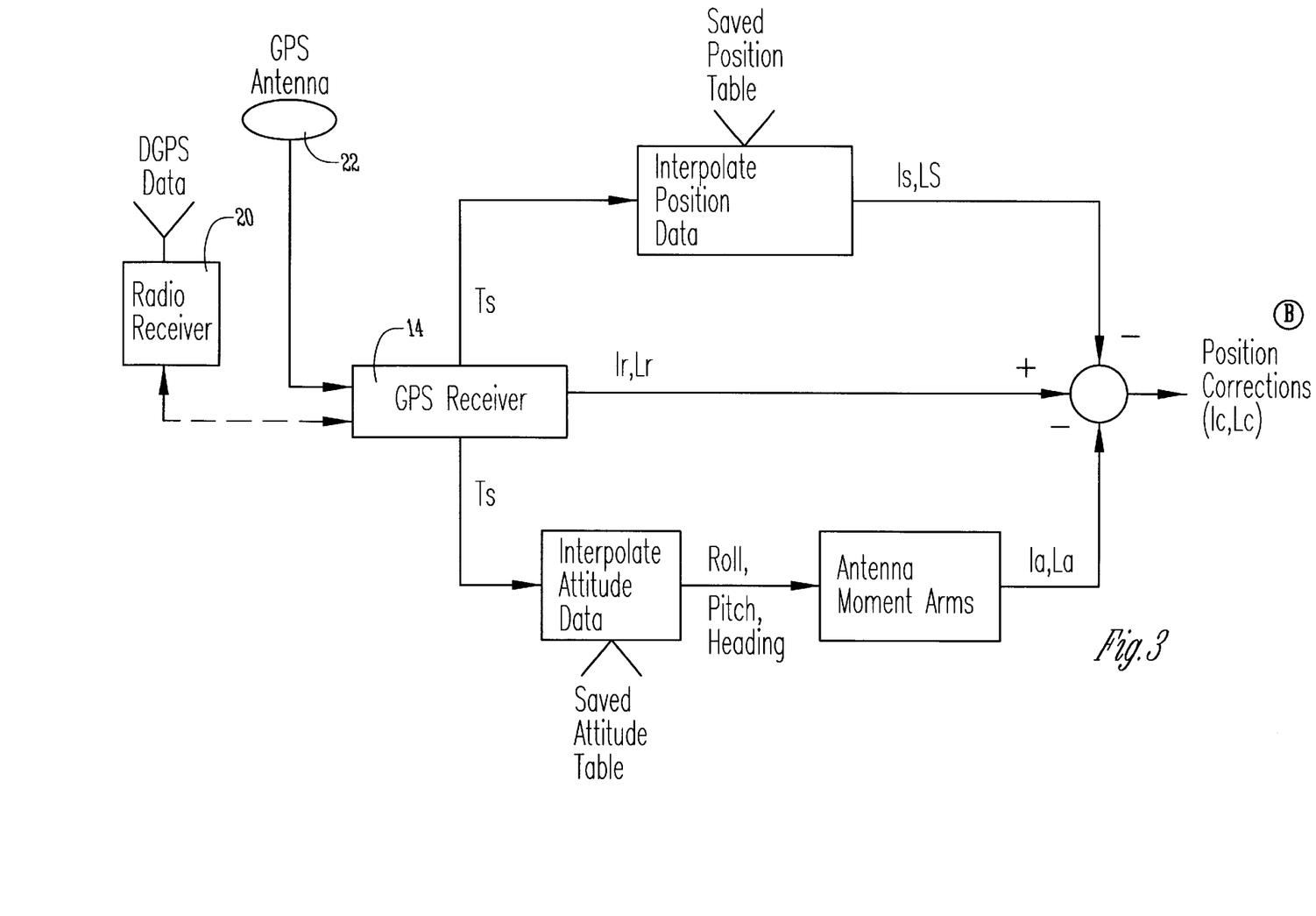
FIG. 3 shows a functional block diagram of the position correction function of the present invention.

FIG. 3 is a block diagram of the position correction function. As described above, the GPS receiver 14 is connected to the GPS antenna 22 to receive GPS data signals from the NAVSTAR satellites. The GPS receiver 14 also receives DGPS data from the DGPS radio receiver 20 to improve the GPS accuracy. The position corrections lc, Lc are calculated based on the latest position lr, Lr provided by the GPS receiver 14, the saved/interpolated dead reckoned position ls, Ls, and the GPS antenna moment arm (lever arm) corrections (discussed below) la, La based on the saved/interpolated attitude data corresponding to the GPS data time.

The system uses the attitude data from the navigation system 10 for GPS antenna lever arm corrections. An antenna mounted on top of a vehicle such as a tractor or floater would be about 13 feet from the ground and will experience large attitude excursions as the vehicle swaths a field. As shown in FIG. 3, the system takes this into account by using the attitude data to make GPS position corrections based on the current attitude of the vehicle and the known position of the GPS antenna relative to the vehicle. As a result, as the vehicle travels over terraces, ruts, bumps, etc., the relatively large swings of the GPS antenna will not effect the accuracy of the GPS position. Using similar techniques, the position calculated by the system can be transferred to any part of the vehicle, for example to the end of a sprayer boom.

Figure 4:
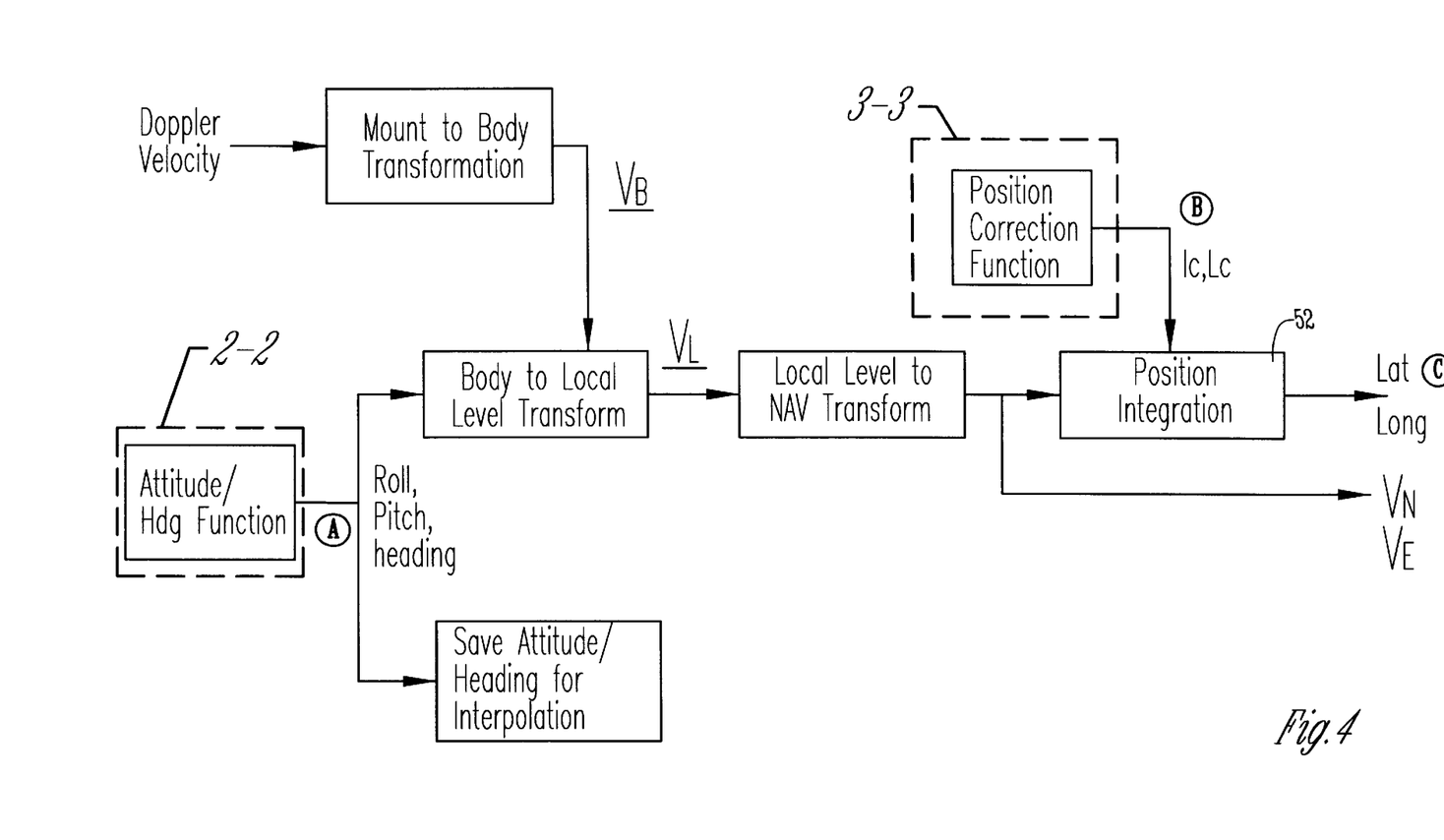
FIG. 4 shows a functional block diagram of the dead reckoning navigation function of the present invention.

FIG. 4 shows a block diagram of the dead reckoning navigation function. The velocity sensed by the Doppler velocity sensor 30 is transformed from mount to body axes, then transformed from body to local level axes using the attitude (pitch and roll) and heading data from the attitude integration algorithm 42 shown in FIG. 2. After the body to local level transform, the velocity is then transformed from local level to north referenced navigation axes. Finally, the data is provided to the position integration function 52 which is reset according to the available position correction values lc, Lc coming from the position correction function shown in FIG. 3.

Figure 5:
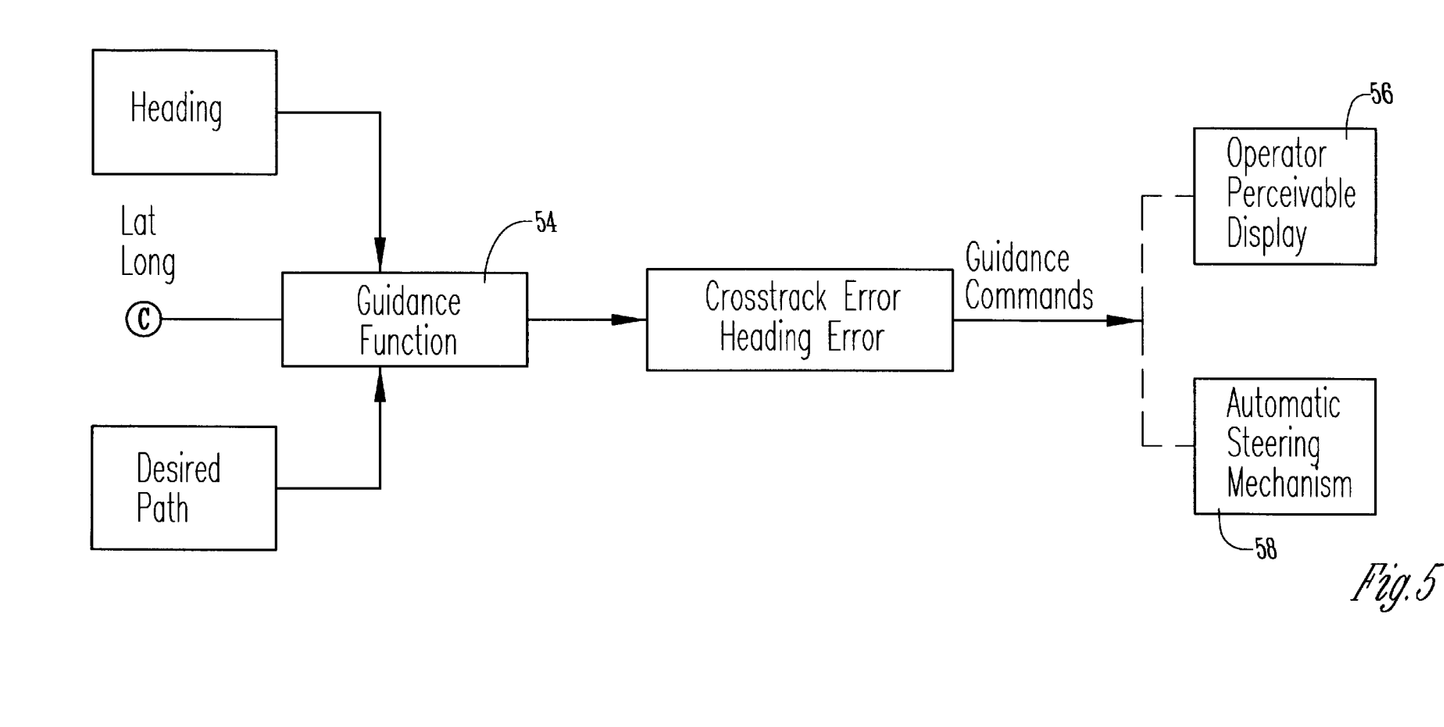
FIG. 5 shows a functional block diagram of the guidance function of the present invention.

FIG. 5 shows a block diagram of the guidance function of the present invention. As shown in FIG. 5, the position of the vehicle determined by the position integration (FIG. 4) is supplied to a guidance algorithm 54 along with the vehicle's heading and the desired path. The guidance algorithm 54 uses this data to determine the cross track error and the heading error. From the cross track and heading errors, the system creates guidance commands. The guidance commands are provided to an operator perceivable display 56 and/or an automatic steering mechanism 58 (see discussion below). The display 56 may take on any form. The display 56 could be display unit 18 (discussed above), a light bar (discussed below), or any other type of operator perceivable indicator. The automatic steering mechanism 58 could also take on any form. For example, the steering mechanism could be a hydraulic steering mechanism.

The navigation/guidance system of the present invention operates as follows. Before the host vehicle moves, the navigation system will initialize itself. The attitude (pitch and roll) is initialized by the accelerometers 26. The heading is initialized by the magnetic heading compass 28. The heading initialization is the most important initialization step. If the vehicle is moving the magnetic heading compass 28 will not be used to initialize the heading. The system is initialized based on where the operator of the vehicle indicates the vehicle is located and/or by GPS data. In other words, the operator can manually enter in the initial location and/or the system can use the GPS location.

Once the host vehicle begins moving the system 10 uses the various sensors to sense the movement of the vehicle. The attitude (pitch and roll) and heading of the host vehicle is sensed by the gyros 24. The speed of the vehicle is sensed by the Doppler radar 30. After sensing the attitude, heading, and speed, the system 10 calculates the velocity of the vehicle. The velocity of the vehicle is then integrated to determine the position of the vehicle. The system then uses a process to correct for errors in the system (see FIG. 3). The speed, heading and dead reckoning position errors are corrected by periodic GPS fixes. The attitude pitch and roll errors are corrected by sensing the acceleration caused by the motion of the vehicle. This is done via the accelerometers 26 and the knowledge of the vehicle speed and rotation rate. The accelerometers 26 sense the specific force accelerations acting on the vehicle including gravity, the acceleration of the vehicle, and centrifugal force. The gravity force is a known value and can be subtracted out. The remaining accelerations are then integrated to get a velocity. Similarly, the velocity and rotation rate of the vehicle are known and can be subtracted out. The remaining values can be used to correct the attitude errors.

A vehicle using the navigation system 10 to help control a guidance system operates as follows and as described with FIG. 5 above. The primary information used by the guidance system from the navigation system 10 is the position of the host vehicle. As shown in FIG. 5, the guidance system receives a position signal from the navigation system 10 at a rate of 10 Hz. The guidance system also receives a vehicle heading signal from the navigation system 10 at a 10 Hz rate. Of course, the position and heading data could be received at any other suitable rate, but 10 Hz is the preferred rate. The desired path of the vehicle is provided to the guidance system from the processor memory, user input, or any other source. The guidance system computes cross track and heading error. Cross track error is the distance the vehicle is off from the desired path. Heading error is defined as the angular difference between the vehicle velocity and the desired path. The goal of the guidance system is to drive the cross track error to zero by guiding the vehicle along a desired path. The guidance algorithm 54 described above calculates the cross track error and the heading error to create guidance commands. These guidance commands are the steering signal used by the operator or by an automatic steering mechanism to steer the vehicle along the desired path.

A vehicle equipped with the navigation system 10 of the present invention is capable of very accurately keeping track of where the vehicle is and where it has already been. This information can be used for any number of purposes or applications. The navigation system provides accurate, real time data sufficient to allow a guidance system to navigate along a curved path.

With the navigation system 10 of the present invention used on an agricultural vehicle such as a tractor or floater, the vehicle would have many capabilities. An operator of the vehicle could manually steer through a path in the field and then use the system to guide the vehicle almost exactly parallel to the path on the next swath (see FIG. 7, discussed below). This would maximize the efficiency of the vehicle and make the operator's tasks easier and more reliable. Similarly, an operator of the vehicle could manually navigate the vehicle around the edge of a field and command the vehicle to automatically cover the remainder of the field within the outside path. Since the system would have the previous paths in memory, the system would know what portions of the field remain and would be able to cover the remainder of the field. The operator could also manually navigate around waterways and allow the system to automatically navigate around the waterways when they are encountered. The system could also be used to help control the operation of machinery such as sprayers, disks, etc. connected to the vehicles. For example, when a vehicle is turning around at the end of a field and is traveling over areas already sprayed, the sprayers could be automatically turned off until they reach a portion of the field not previously sprayed. Whatever the system is used for, the navigation information obtained could be saved and stored for subsequent operations in the same field. For example, once the system knows the locations of borders, obstacles, etc. in a field, that information can be used later to automatically navigate around a field without "relearning" that information. That would make the system even more efficient after the initial operation in a particular field.

Figure 6:
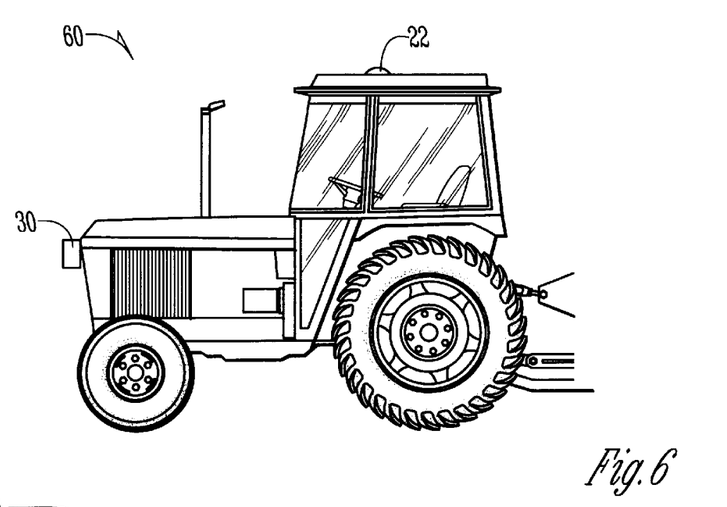
FIG. 6 shows a tractor using the system of the present invention.

FIG. 6 shows a tractor 60 incorporating the present invention. A GPS antenna 22 is mounted to the top of the tractor 60. The Doppler sensor 30 is mounted on the front of the tractor 60. The remaining components of the system 10 are also mounted to the tractor 60.

Figure 7:
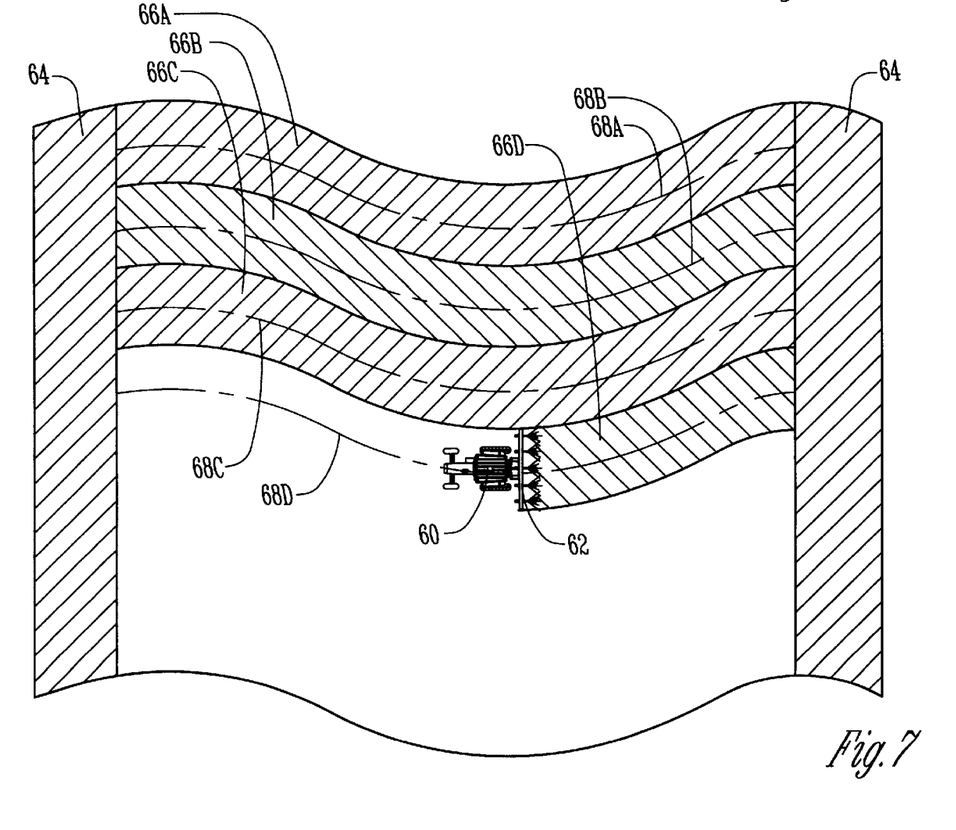
FIG. 7 is an aerial view of a field being worked by the tractor shown in FIG. 6.

FIG. 7 shows an aerial view of a field being worked by the tractor 60. The tractor is shown pulling a sprayer 62 through the field. As shown in FIG. 7, the tractor 60 first sprayed the end rows 64. Next, the tractor was guided along a first swath 66A which followed the shape of the edge of the field. Dashed line 68A shows the path of the tractor 60 during the first swath 66A. The swath 66A is shaded to show that it was sprayed. At the end of the first swath 66A, the guidance system, knowing the location of the end rows 64 and knowing the location of the first swath 66A is able to cause the tractor 60 to turn around and follow the path 68B to start the second swath 66B. FIG. 7 shows the tractor 60 as it is making a fourth swath 66D following the path 68D. Also note that the sprayer 62 can be automatically turned off at the end of each swath 66 as the sprayers pass over portions of the field already sprayed As discussed above, the system 10 is capable of navigating in a curved or uneven path.

An agricultural floater equipped with the present invention would have many capabilities not found in the prior art. First, the reliability of the operators hired to operate the floaters would be less important. The guidance system on the floater would enable the floater to automatically move through the field, for example with an automatic hydraulic steering system. Alternatively, the guidance system could assist the operator in moving through the field via a light bar or other display device. As a result, the entire field would be covered with the proper amount of chemicals giving the farmer higher yields and saving the chemical supplier money from less wasted chemicals. Second, the floaters could operate at night since the operator would not need to watch for the foam markers or other external indictors required by prior art systems. As a result, the chemical applier could use and maintain fewer floaters to spray the same amount of land.

Other applications of the present invention can be seen as well. For example, when the navigation/guidance system is applied to any other vehicle, many of the same advantages are found. In addition, given a typical $90,000 tractor, $60,000 of that cost goes toward the creature comforts such as a cab, air conditioning, etc. With a fully automatic guidance system, the operator and hence the creature comforts are not needed and $60,000 could be cut from the price of the tractor. The navigation/guidance system could also be used to quickly and efficiently survey land. With the system installed on a vehicle, for example a 4-wheeler, a user could simply drive over a given piece of land while the system keeps a record of precisely where the vehicle has been and the elevation at each point. This data could be transmitted or downloaded to a computer to be interpreted and used. Software such as CAD could then be used to create three dimensional maps of the surveyed land. Lawn services could use the navigation/guidance system with lawn sprayers or mowers as described above. Excavating machinery such as bulldozers could use the system to automatically excavate land. The navigation system is also capable of use on boats or ships. Vehicles traveling through water encounter similar problems as do vehicles traveling on the ground. For example, waves and strong winds as well as other forces can dramatically manipulate the attitude of ship causing problems described above such as the GPS antenna lever arm errors. The navigation system could also be used on boats to survey the bottom of bodies of water. An additional sensor such as sonar could be used to sense the depth of the water at every location that the boat traveled over. This data could be used to determine where silt build-up exists around dams for example. The rail industry could use the navigation/guidance system to keep track of and control trains. The navigation system will continue to operate even while the trains go trough tunnels or under foliage, etc. The railroads could fit more trains on a given track if they knew precisely where each train was. Also, the system is accurate enough to indicate which track a train is on, even where two tracks run parallel in close proximity. Regardless of how the present invention is used, the user will save time, labor, cost, etc.

The preferred embodiment of the navigation system 10 of the present invention may be configured as follows. A sensor package is contained within a single enclosure. The sensor package includes the rate gyros 24, the accelerometers 26 and the magnetic heading compass 28. The sensor package could act as a stand-alone inertial measurement unit with the capability of connecting to a vehicle and any other sensors desired. The Doppler radar position sensor 30 is attached to the vehicle and preferably pointed downward toward the ground at an angle of about 30°. A display head includes the display unit 18, the processor 12, the GPS receiver 14, a tactile device (e.g., a keypad or keyboard), the DGPS radio receiver and the required power supplies. Two antennas (one GPS and one DGPS) are attached to the vehicle and connected to the appropriate receiver. Finally, a light bar is installed on the vehicle in view of the operator and also connected to the display head. The light bar is comprised of a row of lights that indicate the magnitude and direction of the cross track error to the operator. In response to the light bar indication the operator could steer left or right in order to continue on a desired path. Optionally, the system 10 may provide guidance commands to an automatic steering mechanism.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of navigating a non-airborne vehicle comprising the steps of:

providing a position change sensor;

sensing the speed of the vehicle using the position change sensor;

providing an angular change sensor;

sensing the heading and attitude of the vehicle using the angular change sensor;

providing an accelerometer;

correcting the sensed attitude of the vehicle using data from the accelerometer, position change sensor and angular change sensor;

determining the position of the vehicle based on a known previous position and the sensed speed, heading, and attitude of the vehicle;

providing a radio navigation system;

storing positions of the vehicle each relative to a given point in time;

determining an external position reference for a given point in time using data from the radio navigation system; and correcting any error in the determined position of the vehicle using the determined external position reference and comparing it to the stored position of the vehicle for the same point in time.

2. The method of claim 1 wherein said position change sensor is comprised of a Doppler radar.

3. The method of claim 1 wherein said angular change sensor is comprised of a gyro.

4. The method of claim 1 wherein said accelerometer is comprised of a tilt sensor.

5. The method of claim 1 wherein said accelerometer is comprised of a inclinometer.

6. The method of claim 1 wherein said radio navigation system is comprised of a GPS system.

7. The method of claim 1 wherein said radio navigation system is comprised of a LORAN system.

8. The method of claim 1 wherein said radio navigation system is comprised of a GLONASS system.

9. The method of claim 1 further comprising the steps of:

providing a radio navigation antenna for use with the radio navigation system, said antenna having a known location relative to a reference point on the vehicle;

determining the position of the radio navigation antenna based on the attitude of the vehicle and the known location of the antenna relative to the reference point; and determining the external position reference using data from the radio navigation system and using the determined position of the radio navigation antenna.

10. The method of claim 1 wherein the navigating comprises autonomous steering of the vehicle.

11. The method of claim 1 wherein the navigating comprises surveying or mapping of an area.

12. The method of claim 1 wherein the navigating comprises controlling location and travel of trains.

13. A navigation system for a non-airborne vehicle comprising:

a position change sensor for sensing the speed of the vehicle;

a set of gyros for sensing the attitude and heading of the vehicle;

a set of accelerometers for sensing the forces acting on the vehicle;

a radio navigation system for sensing an external position reference for a given point in time, said radio navigation system including an antenna coupled to said vehicle at a known location relative to the vehicle; and a processor connected to each of said sensors and radio navigation system, said processor performing the processing steps of:

correcting the sensed attitude of the vehicle using the sensed forces acting on the vehicle;

determining the velocity of the vehicle using the sensed speed, heading and attitude of the vehicle, determining a first position of the vehicle by integrating the determined velocity, storing said first position of the vehicle each relative to a given point in time;

determining the position of the antenna based on the attitude of the vehicle and the known location of the antenna relative to the vehicle, correcting the external position reference based on the determined position of the antenna, and correcting the determined first position using the corrected external position reference by comparing it to the stored first position of the vehicle for the same point in time.

14. The navigation system of claim 13 wherein said position change sensor is comprised of a Doppler radar.

15. The navigation system of claim 13 wherein said set of gyros is comprised of two gyro sensors.

16. The navigation system of claim 13 wherein said set of gyros is comprised of three gyro sensors.

17. The navigation system of claim 13 wherein said radio navigation system is a GPS system.

18. The method of claim 17 wherein said radio navigation system further comprises a DGPS receiver.

19. The system of claim 13 wherein the navigating comprises autonomous steering of the vehicle.

20. The system of claim 13 wherein the navigating comprises surveying or mapping of an area.

21. The navigation system of claim 13 further comprising a guidance system port for providing data to a vehicle steering system.

22. The navigation system of claim 21 wherein said data provided to a vehicle guidance system relates to the vehicle position and heading.

23. The navigation system of claim 22 wherein said data also relates to a desired path.

24. The navigation system of claim 22 wherein said data comprises a steering command signal.

25. The navigation system of claim 21 wherein said data provided to a vehicle guidance system includes the cross track error and heading error.

26. A method of navigating a land-based agricultural vehicle through a field comprising the steps of:

sensing the speed of the vehicle;

providing an inertial sensor system;

sensing the heading and attitude of the vehicle using the inertial sensor system;

determining the position of the vehicle based on a known previous position and the sensed speed, heading, and attitude of the vehicle;

storing positions of the vehicle each relative to a given point in time;

providing a radio navigation system;

determining an external position reference for a given point in time using data from the radio navigation system;

producing true position data by correcting any error in the determined position of the vehicle using the external position reference and comparing it to the stored position of the vehicle for the same point in time; and using the true position data to accurately navigate through a field.

27. The method of claim 26 further comprising the steps of:

providing a radio navigation system antenna coupled to the vehicle at a known location relative to the vehicle;

determining the position of the antenna based on the attitude of the vehicle and the location of the antenna relative to the vehicle; and refining the determined external position reference based on the determined position of the antenna.

28. The method of claim 26 wherein said position change sensor is comprised of a Doppler radar.

29. The method of claim 26 wherein said heading and attitude are sensed using an angular change sensor.

30. The method of claim 29 wherein said angular change sensor is comprised of a plurality of gyros.

31. The method of claim 26 further comprising the steps of:

sensing the acceleration caused by the vehicle;

using the sensed acceleration caused by the vehicle to refine the determined position of the vehicle.

32. The method of claim 26 wherein said radio navigation system is comprised of a GPS.

33. The method of claim 26 further comprising the steps of determining the cross track error and heading error based on the true position data and a desired navigation path.

34. The method of claim 33 further comprising the step of creating a guidance command signal based on the determined cross track error and heading error.

35. The method of claim 34 further comprising the step of displaying information based on the guidance control signal.

36. The method of claim 26 further comprising the step of displaying information based on the true position data.

37. The method of claim 26 wherein said land based agricultural vehicle is comprised of a chemical sprayer.

38. The method of claim 26 wherein the navigating comprises autonomous steering of the vehicle.

39. The method of claim 26 wherein the navigating comprises surveying or mapping of an area.

40. The method of claim 26 wherein the navigating comprises controlling location and travel of trains.

41. A method of compensating for a radio navigation system antenna lever arm for a non-airborne vehicle comprising the steps of:

provide a radio navigation system antenna having a known location relative to a reference point on the vehicle;

providing an inertial system for sensing the angular changes of the vehicle;

determining the attitude of the vehicle using data from the inertial system; and determining the position of the radio navigation system antenna based on the attitude of the vehicle and the known location of the radio navigation system antenna relative to the reference point.

42. A navigation system for a tractor comprising:

a position change sensor for sensing the speed of the tractor;

a set of gyros for sensing the attitude and heading of the tractor;

a set of angular change sensors for sensing the pitch and roll of the tractor;

a radio navigation system for sensing an external position reference for a given point in time, said radio navigation system including an antenna coupled to said tractor at a known location relative to the tractor;

a processor connected to each of said sensors and radio navigation system, said processor performing the processing steps of:

correcting the sensed attitude of the tractor using the sensed pitch and roll of the tractor;

determining the velocity of the tractor using the sensed speed, heading and attitude of the tractor, determining a first position of the tractor by integrating the determined velocity, storing said first positions of the vehicle each relative to a given point in time;

determining the position of the antenna based on the attitude of the tractor and the known location of the antenna relative to the tractor, correcting the external position reference based on the determined position of the antenna, and correcting the determined first position using the corrected external position reference by comparing it to the stored position of the vehicle for the same point in time;

an output port connected to said processor for providing data to a tractor guidance system.

43. The navigation system of claim 42 further comprising a user perceivable display connected to said processor for displaying information.

44. The navigation system of claim 43 wherein said display is comprised of a light bar mounted on the tractor.

45. The navigation system of claim 42 wherein said data is comprised of the cross track error and the heading error.

46. The navigation system of claim 42 wherein said tractor guidance system is comprised of an automatic steering system.

47. The navigation system of claim 46 wherein said data is comprised of guidance commands for the automatic steering system.

48. The method of claim 42 wherein the navigating comprises surveying or mapping of an area.

49. A method of navigating a moving non-airborne vehicle comprising the steps of:

(a) sensing the speed of a vehicle;

(b) sensing the heading and attitude of the vehicle from a known initialization position using an inertial sensor system having inherent drift that increases over time;

(c) estimating in real time the position of the vehicle for discrete points in time based on steps (a) and (b);

(d) storing the estimates correlated to the discrete points in time;

(e) correcting error between estimated position and actual position by periodically determining actual position correlated to discrete points in time of the vehicle, comparing a stored estimated position with an actual position for the radio navigation system, and adjusting estimated position if the comparison falls outside a predetermined range;

thus periodically producing real-time true position data for navigation of the vehicle by correcting for the inherent drift of the inertial sensor system, by periodically, if needed, comparing past estimated and past actual position and adjusting, if, needed, therebetween.

50. The method of claim 49 wherein the navigating comprises autonomous steering of the vehicle.

51. The method of claim 49 wherein the navigating comprises surveying or mapping of an area.

* * * * *